United States Patent
Chu et al.

(10) Patent No.: US 7,464,559 B2
(45) Date of Patent: *Dec. 16, 2008

(54) BOTTLE COOLER AND METHOD

(75) Inventors: Osvaldo A. Chu, Sarasota, FL (US); Rei-Young Amos Wu, Palatine, FL (US); Ashok Shashikant Dhruv, Englewood, CO (US)

(73) Assignee: Stokely-Van Camp, Inc., Chicago, IL (US)

( * ) Notice: Subject to any disclaimer, the term of this patent is extended or adjusted under 35 U.S.C. 154(b) by 496 days.

This patent is subject to a terminal disclaimer.

(21) Appl. No.: 11/245,627

(22) Filed: Oct. 7, 2005

(65) Prior Publication Data
US 2007/0079618 A1     Apr. 12, 2007

(51) Int. Cl.
F28D 3/00 (2006.01)
A23L 3/18 (2006.01)
A23L 3/10 (2006.01)
A23L 3/26 (2006.01)

(52) U.S. Cl. ............... 62/171; 99/470; 426/407; 426/521; 426/524

(58) Field of Classification Search ............ 426/232, 426/407, 405, 520, 521, 524; 99/467, 470; 165/66; 62/171, 64
See application file for complete search history.

(56) References Cited

U.S. PATENT DOCUMENTS

| | | | |
|---|---|---|---|
| 2,282,187 A | | 8/1939 | Herold et al. |
| 4,279,858 A | | 7/1981 | Huling |
| 4,331,629 A | | 5/1982 | Huling |
| 4,384,463 A | | 5/1983 | Rica et al. |
| 4,437,315 A | | 3/1984 | Rica et al. |
| 4,441,406 A | | 4/1984 | Becker et al. |
| 4,693,902 A | | 9/1987 | Richmond et al. |
| 4,727,800 A | | 3/1988 | Richmond et al. |
| 4,801,466 A | | 1/1989 | Clyne et al. |
| 4,841,457 A | | 6/1989 | Clyne et al. |
| 4,849,235 A | * | 7/1989 | Braymand ............ 426/232 |
| 5,630,321 A | * | 5/1997 | Miller ............ 62/63 |
| 5,772,958 A | | 6/1998 | Nielsen |
| 6,662,574 B2 | | 12/2003 | Loibl et al. |
| 2004/0112069 A1 | | 6/2004 | Loibl et al. |
| 2007/0082100 A1 | * | 4/2007 | Dhruv et al. ............ 426/521 |

* cited by examiner

Primary Examiner—Chen-Wen Jiang
(74) Attorney, Agent, or Firm—Banner & Witcoff, Ltd.

(57) ABSTRACT

An improved method and apparatus for cooling filled food containers having hot contents includes spraying a coolant onto the containers. As the hot contents cool, the flow rate of coolant is decreased. The coolant is at least about 40° F. cooler than the initial average temperature of the hot contents. In one embodiment, the temperature of the spent coolant typically does not vary more than about 6° F.

20 Claims, 2 Drawing Sheets

BOTTLE COOLER AND METHOD

TECHNICAL FIELD

The invention is directed to an improved bottle cooler device and method for cooling bottles or containers by spraying a coolant onto the containers.

BACKGROUND OF THE INVENTION

Numerous types of foods, including beverages, are packed or bottled as a hot-fill product or otherwise are heated. The result is a hot container of food.

Generally, it is highly desirable to cool the hot containers of food quickly. First, some of the foods can degrade if they are not cooled quickly due to overcooking, bacterial action or due to chemical reactions, sometimes with the container. Second, without quickly cooling the containers, the containers would have to be stored and removed from storage prior to labeling, which is highly inefficient. Thus, there is a need for quickly cooling containers of hot food.

Prior art container cooling methods have not been designed to cool bottles efficiently and quickly. They often contain multiple cooling zones where each zone uses coolants of different temperatures. In some cases, coolant is sprayed in one zone, collected and sprayed in a second zone so that the flow of containers relative to the flow of coolant approximates countercurrent. Although countercurrent flow is very efficient in liquid-liquid heat exchangers, countercurrent flow is very inefficient for this application. Countercurrent flow requires multiple pumps, controls, and more complicated piping to be implemented for the purpose of cooling containers. Hence, there is a need to cool containers efficiently with less equipment.

SUMMARY OF THE INVENTION

In one embodiment, a method for cooling filled food containers is provided. The containers have hot contents. The method includes spraying coolant onto the containers. The hot contents have an initial average temperature. The coolant is at least 40° F. cooler than the initial average temperature of the hot contents. The method also includes decreasing the flow rate of coolant as the average temperature of the hot contents decreases. As used herein, the term "food" or "foods" includes "beverage" or "beverages," respectively.

In one embodiment, a second method for cooling filled food containers is provided. The containers have hot contents. The method includes spraying coolant onto the containers. The hot contents have an initial average temperature. The method includes decreasing the flow rate of coolant as the average temperature of the hot contents decreases. Preferably, the temperature of the coolant after it has completed its contact with the bottles does not vary more than about 6° F. throughout the system, including during the time it takes to cool the average temperature of the hot contents by about 45° F. or more, such as about 60° F. or more.

In an alternate embodiment, an apparatus for cooling containers having hot contents is provided. The apparatus includes a conveyor for conveying containers having hot contents and spray nozzles. The spray nozzles are placed and directed for spraying coolant onto the containers on the conveyor. The spray nozzles are spaced apart. They have a size corresponding to a flow rate capacity. The spacing and sizing of the spray nozzles are selected so that the flow rate of coolant decreases in the direction of movement of the conveyor.

By having a high initial flow rate, the cooling of containers occurs more rapidly initially when the temperature of the containers is hottest. As the containers cool, less coolant is sprayed because it is not efficient to use the same initial flow rate of coolant. Because the cooling occurs rapidly and efficiently, the amount of space and conveying equipment necessary to cool the containers is minimized. Because the conveying equipment represents the bulk of the cost of purchasing and maintenance of a bottle cooler, the invention provides substantial savings in the capital and operating costs of a bottle cooler.

DETAILED DESCRIPTION OF THE INVENTION

Referring to the Figures generally, there is illustrated a bottle cooling system 10 in accordance with the invention. Bottle cooling system 10 is composed of a conveyor 12, a coolant supply and collection system 14 and a water spray system 16.

Figure 1:
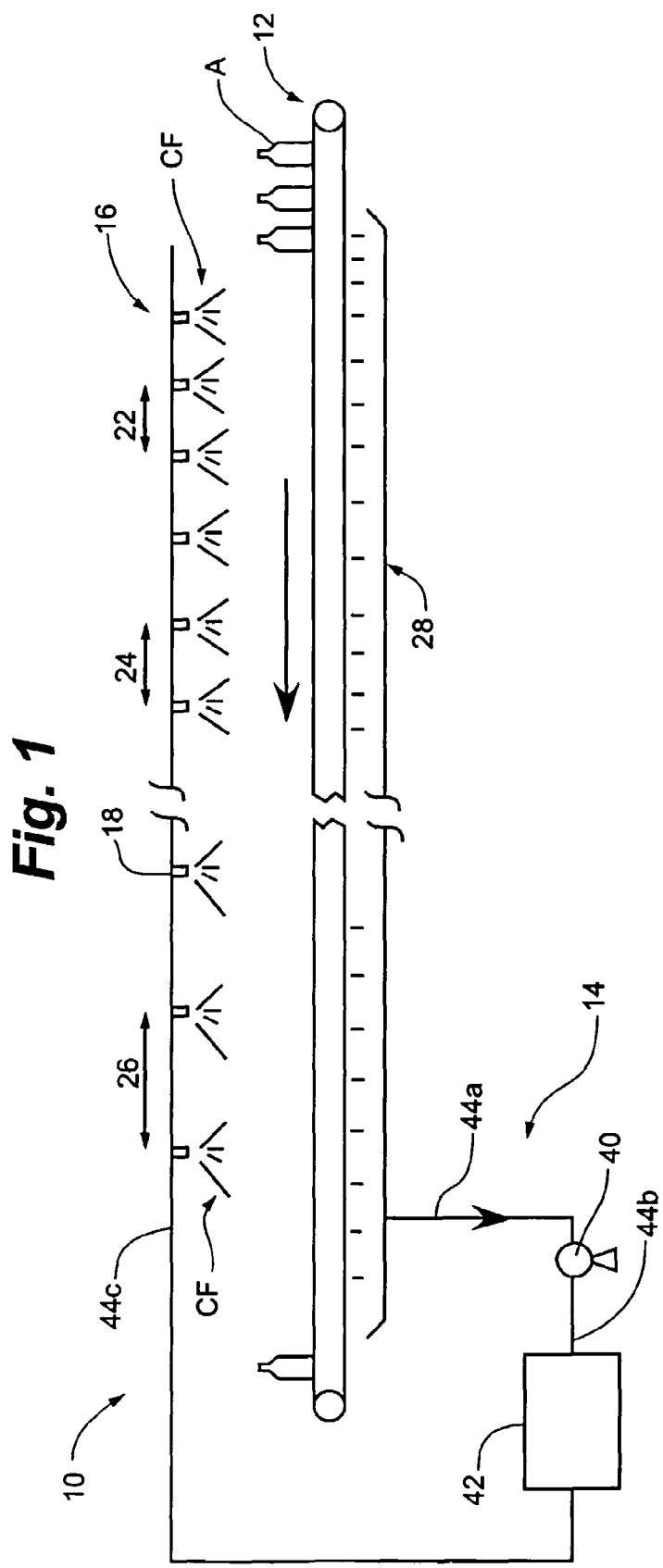
FIG. 1 is a schematic elevational view of a bottle cooler device of the invention.

Conveyor 12 is shown schematically in FIG. 1. Any suitable conveyor known in the art to convey containers A can be utilized. Consequently, a detailed description of conveyor 12 is not provided. Conveyor 12 is suitably positioned beneath spray system 16 so that containers A contained thereon are sprayed with cooling fluid CF. Preferably, conveyor 12 has a belt which is perforated or grooved so that water sprayed onto the containers can drain therethrough. Typically, conveyor 12 is wide enough to allow a plurality of containers A to be placed across the width of conveyor 12.

Water spray system 16 is an important part of the present invention. As illustrated, water spray system 16 includes a plurality of spray nozzles 18 for spraying coolant onto containers A located on conveyor 12. Spray nozzles 18 are generally located above conveyor 12 and extend therealong. Spray nozzles 18 can be any nozzles suitable for spraying coolant onto containers. For example, spray nozzles 18 can be hollow cone or fan nozzles among others. The spray nozzles can be positioned to deliver coolant flow parallel to the vertical surface of the container A or, if desired, at a suitable angle to this vertical surface. Preferably spray nozzles 18 are arranged to provide uniform coverage of coolant across a particular width of conveyor 12 so that containers A located in different locations along a particular width of conveyor 12 receive substantially the same amount of cooling fluid CF so that each bottle A is cooled substantially equally.

Figure 2:
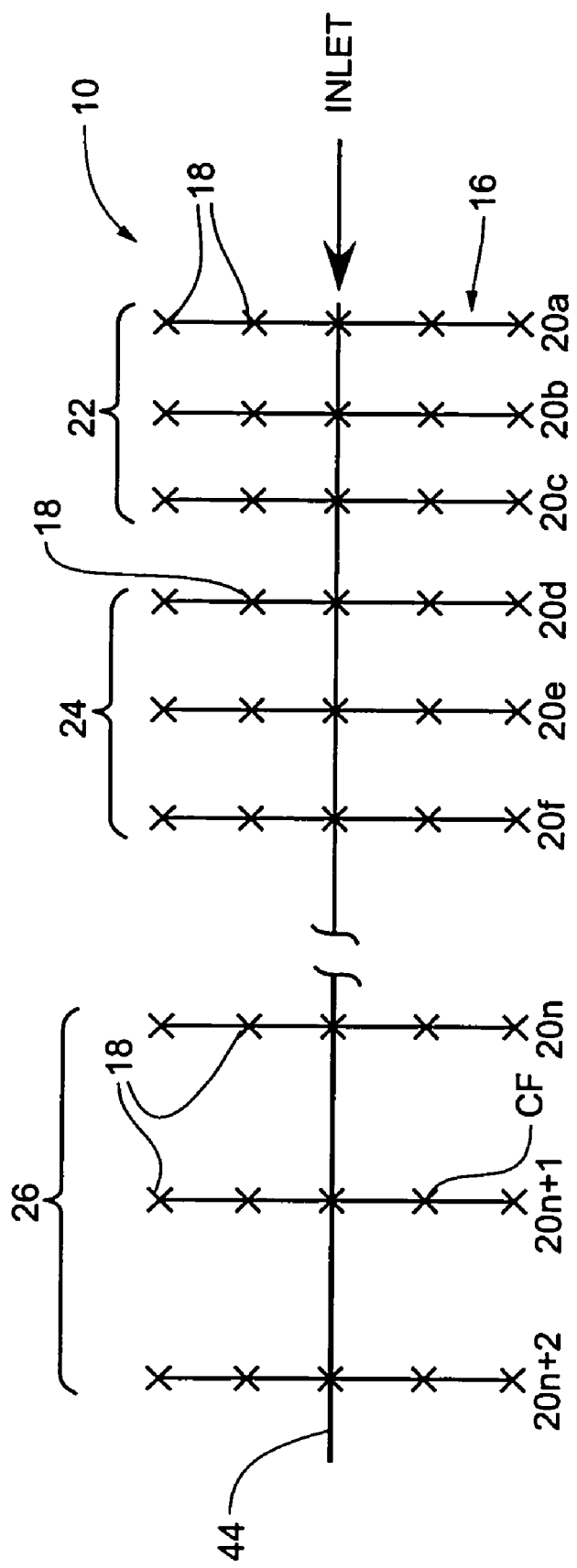
FIG. 2 is a schematic plan view of the bottle cooler in the plane of the spray.

Generally, spray nozzles 18 are arrayed in rows $20a$-$20f$ ... $20_n$-$20_{n+2}$ across the width of conveyor 12 as shown in FIG. 2. Rows 20 are spaced apart at increasing intervals in the direction of travel of conveyor 12. With reference to FIGS. 1 and 2, intervals 22, 24 and 26 are shown. Preferably there are at least three different zones or intervals, more preferably at least four, even more preferably at least five, and most preferably at least six zones, each zone having a predetermined coolant flow rate or spray density, with the coolant flow rate decreasing in each downstream zone compared to the upstream zone or zones. The increased longitudinal spacing decreases the spray density and flow rate of coolant in the direction of movement of conveyor 12. More preferably the spacing of the nozzles 18 increases substantially exponentially in the direction of movement of conveyor 12. For reasons of practicality, typically it is sufficient for the spacing to be increased in six- and twelve-inch intervals for the spacing to increase substantially exponentially. Most preferably the spacing is such that the flow rate of water within the interval is substantially proportional to the difference between the temperature of the coolant and the average temperature of the hot contents within the interval. Such a spacing is believed to produce a rapid rate of initial cooling while efficiently decreasing the flow where higher flows would not be as efficient.

Preferably, the spray density (or flow rate) decreases 60-90% between the maximum spray intensity and the minimum spray intensity. More preferably, the spray density decreases 75-85% between the maximum spray intensity and the minimum spray intensity. Preferably, the point of maximum intensity is at or near the point of initial spraying and the point of minimum intensity is at or near the end of spraying. Preferably, the minimum spray intensity exceeds the spray intensity where the rate of heat transfer decreases rapidly. A rapid decrease can occur when the coverage of coolant over the bottles begins to not substantially cover all of the sides of a container A. A rapid decrease can also occur if heat transfer within the hot contents changes from convection to conduction. The point where decreases become non-economical can be determined by routine experimentation. Preferably, the spacing of the nozzles increases monotonically and consequently the spray density decreases monotonically. However, it is not necessary for this to be so to fall within the scope of the invention, although deviations from a monotonic decrease are generally believed to be less efficient.

Spray density is the flow rate of coolant sprayed onto an area of a conveyor belt when bottles are not present. The spray density will vary from point to point due to the unequal distribution of coolant from the spray nozzles and the varying overlap of sprays. Thus, it is important when calculating or measuring the spray density to use a representative spray density to characterize maximum, minimum and other spray densities. Generally, but not necessarily, the spray density is measured across the entire width of the conveyor and spans one or two intervals. Generally, when the flow rate of sprayed coolant is discussed within the specification spray density is also implied.

Alternatively or in addition, the number of spray nozzles 18 in rows 20 can be decreased in the direction of movement of conveyor 12 (not shown). Alternatively or in addition, the flow rate capacity of nozzles 18 can be decreased in the direction of movement of conveyor 12.

Coolant supply and collection system 14 includes a sump 28, a pump 40, a heat exchanger 42 and supply piping 44*a*, 44*b* and 44*c*.

Cooling fluid CF can be any suitable liquid, commonly water, which can be sourced from a municipal water supply or a local water well, for example. Preferably, cooling fluid CF is collected, cooled and reused. This is commonly accomplished by sump 28 that collects spent cooling fluid CF after being sprayed through nozzles 18 and onto containers A to cool them and then falling through conveyor 12. From sump 28 the spent cooling fluid CF travels through piping 44*a* and is pumped via pump 40 through piping 44*b* and through heat exchanger 42, which is suitably cooled by a cooling fluid. Thereafter, cooling fluid CF is directed via piping 44*c* through nozzles 18. Means for cooling captured cooling fluid CF includes any evaporative cooling equipment such as a cooling tower, any mechanical cooling equipment such as a chiller, or any heat exchange equipment such as a heat exchanger or radiator. Heat exchangers are preferred for cooling shelf-stable food products. The heat exchanger can, for example, use utility cooling water to cool cooling fluid CF. Utility cooling water can be cooled by a cooling tower, for example.

Applicants have discovered that cooling of containers having hot contents can be made greatly improved by maximizing the initial rate of cooling of the containers. To maximize the cooling rate, the flow rate of coolant sprayed onto containers is maximized initially and preferably the temperature of the coolant is approximately the same as the coolant sprayed downstream on the same bottle. By taking the above measures, the temperature differential between the initial average temperature of the contents of a container and the sprayed coolant is maximized thereby increasing the rate of initial heat transfer. Also, the turbulence of the coolant washing over a container is maximized, increasing the rate of heat transfer. Perhaps most importantly, the increased rate of heat transfer tends to induce or increase convection within the container, thereby increasing the rate of heat transfer.

Cooling fluid CF can be any fluid which is preferably at least about 45° F. cooler than the initial average temperature of the hot contents of a container, more preferably at least about 55° F., even more preferably at least about 65° F., still more preferably at least about 75° F., and most preferably at least about 85° F. Preferably, the coolant is water due to its nontoxicity, low cost, and superior heat transfer characteristics. Potential coolants also include ethylene glycol, propylene glycol, and chilled brines.

The containers can be of any shape. The containers can be of any material. The containers can have any suitable content including still and carbonated beverages, alcoholic and non-alcoholic beverages, and solid or non-solid foods enveloped in sauce, syrup, or other liquid. For example, the container can contain a functional beverage, such as one designed for athletes, or apple sauce or some other food product. The material of construction of the containers can be any material including plastic (PET, HDPE, etc.), glass and metal (tin, steel, aluminum, etc.).

In accordance with the invention, the flow rate of coolant is decreased as the average temperature of the hot contents of a container decreases. Decreasing the flow rate of coolant can be accomplished in any suitable manner. If the containers are stationary, spray nozzles can be used which allow different flow rates at different pressures. The flow rate can then be controlled by throttling back control valves as time passes. If the containers are conveyed, then the spray nozzles can be spaced at increasing distances in the direction of movement of a container. Also the spacing of spray nozzles in a direction perpendicular to the movement of the container can be increased as the bottles move downstream. In addition, nozzles having a lesser flow rate can also be used downstream or otherwise decreasing the flow rate through the nozzles can be accomplished. The same objective may also be accomplished by adjusting belt speed, increasing belt speed proportional to temperature decline of the product.

Preferably the temperature of the coolant being sprayed onto the containers does not vary more than about 9° F., more preferably less than about 7° F., even more preferably less than about 5° F., still more preferably less than about 3° F., and most preferably less than about 1° F. while a container is spray cooled.

Preferably, the hot contents are cooled from an average temperature of from about 165° F. or above to below about 100° F., more preferably from about 175° F. or above to below about 100° F., and most preferably from about 185° F. or more to below about 100° F.

The coolant flow rate preferably is decreased at least three times during the cooling of a container, more preferably at least four times, even more preferably at least five times, and most preferably at least six times. Each of the cooling flow rates defines a cooling flow rate zone. Preferably, the decreases are such that the coolant flow rate between successive coolant flow rate zones decreases approximately exponentially during the cooling of a container. In particular, it is most preferred that the coolant flow rate be substantially proportional to the difference between the temperature of the coolant and the average temperature of the hot contents. Preferably, the coolant flow rate in a particular coolant flow rate zone is controlled such that the outlet or spent coolant water temperature in each zone after completing contact with the containers in each coolant flow rate zone does not vary more than about 6° F. More preferably, the flow rate is controlled so that the outlet or spent coolant water rate does not vary by more than 6° F. across two adjacent zones, even more preferably across three adjacent zones, and most preferably across four adjacent zones.

In one embodiment, the containers are made of plastic and contain approximately 20 oz. The hot contents are cooled from an average temperature of approximately 185° F. to below 100° F. within 8.5 minutes.

In another embodiment, the containers are conveyed through a spray of coolant. The conveying can be done by a conveyor. The initial or maximum coolant spray density at the entrance to the spray zone preferably exceeds about 9 gal/min/ft$^2$, more preferably about 12 gal/min/ft$^2$, and most preferably about 15 gal/min/ft$^2$. The average temperature of the hot contents preferably is cooled by about 60° F. or more, more preferably by about 70° F. or more, and most preferably by about 80° F. or more through the spray area. The temperature of the coolant after it has been sprayed onto the containers varies through the spray area preferably by less than about 9° F., more preferably less than about 6° F., even more preferably less than about 4° F., and most preferably less than about 2° F. The smaller the temperature variation of the spent coolant, the more optimal the relative flow rates of coolant in the spray area.

The temperature of coolant after it contacts the containers increases by absorbing heat from the hot container contents. The coolant is then cooled before being recycled. The temperature of the heated coolant can be measured by measuring the temperature of coolant collected under and across the width of conveyor 12 at different locations.

In another embodiment, an apparatus 10 for cooling containers having hot contents is provided. Apparatus 10 has conveyor 12 for conveying containers. Conveyor 12 can be any type of conveyor known in the art.

Preferably, the initial spray density (near the start of the conveyor) is in excess of 9 gal/min/ft$^2$. More preferably it exceeds 12. Most preferably it exceeds 15.

Preferably the spacing and sizing of spray nozzles 18 is selected to cool plastic container A containing approximately 20 oz of hot contents from an average temperature of approximately 185° F. to below 100° F. within about 8.5 minutes.

Preferably, the spacing and sizing of spray nozzles 18 is selected so that the temperature of the spent coolant does not vary more than about 6° F. through the spray zone wherein the average temperature of the hot contents decreases by about 60° F. or more.

Preferably, the method and apparatus of the invention is used to cool the hot contents of a container by at least about 40° F., more preferably at least about 55° F., even more preferably at least about 70° F., and most preferably at least about 80° F.

EXAMPLE 1

Bottle cooler devices in accordance with the invention for cooling 1,200 bottles per minute were designed. The bottles will contain approximately 20 oz of a sports beverage. The contents of the bottle will be cooled from 185° F. to 97.5° F. The devices will have a single cooling water supply temperature for spraying water onto the bottles and a single sump connected to a heat exchanger. The heat exchanger will be connected to a cooling tower, and all the spray nozzles will be connected to the same heat exchanger. There will be 60 bottles across the width of the conveyor.

Based on known heat transfer equations and empirical data for the specific bottle and beverage combination, the invention's bottle coolers will have the characteristics and performance described in the table below.

|  | Example 1A | Example 1B | Example 1C | Example 1D |
|---|---|---|---|---|
| Flow/bottle (gal/bottle) | 2 | 3 | 2 | 2 |
| Total flow rate (gpm) | 2,400 | 3,600 | 2,400 | 2,400 |
| Flow rate from heat exchanger (gpm) | 2,400 | 3,600 | 2,400 | 2,400 |
| Length of belt (feet) | 48 | 48 | 56 | 64 |
| Bottle residence time (min) | 8.45 | 8.45 | 9.85 | 11.26 |
| Average temperature of coolant in sump (° F.) | 97.3 | 94.9 | 97.3 | 97.3 |
| Average temperature of spent coolant (° F.) | 97.3 | 94.9 | 97.3 | 97.3 |
| Overall heat transfer coefficient (BTU/hr/ft$^2$/F.) | 72 | 71 | 62 | 54 |

EXAMPLE 2

Prior art devices are compared to the present invention. Such prior art devices typically have 4 to as many as 10 spray zones. Each zone of the prior art device is defined by its source of coolant. The source of coolant for each zone is a sump underneath each zone; the sump captures cooling water sprayed in the zone. Approximately one third of the flow into a sump is sprayed onto the bottles. The first sump, which is at the end where the bottles exit the bottle cooler, receives cooling water from a heat exchanger and spent spray water from the spray zone above it. Approximately two thirds of the flow rate into the first sump flows into the second sump. Approximately two thirds of the flow rate into the second sump flows into the third sump, and so on for more zones until the last zone. Approximately two thirds of the flow rate into the last sump flows to the heat exchanger for cooling. Each spray zone of the prior art device has the same nozzle spacing.

For purposes of comparison, a prior art device having 4 four spray zones was designed to cool the same number of bottles under the same conditions as Example 1. Based on known heat transfer equations and empirical data for the specific bottle and beverage combination, the prior art bottle coolers will have the characteristics and performance described in the table below.

As can be seen from the table, the invention will achieve greater rates of cooling with a simpler design. In particular, the residence time of bottles in the cooler can be halved by the invention over the prior art design. The simpler design and increased rate of bottle cooling will result in significant capital and operating savings.

|  | Prior Art Bottle Cooler |
| --- | --- |
| Number of spray zones | 4 |
| Flow/bottle (gal/bottle) | 1.9 |
| Flow rate per zone (gpm/zone) | 570 |
| Flow rate from heat exchanger | 1200 |
| Length of belt (feet) | 96 |
| Bottle residence time (min) | 16.9 |
| Average temperature of coolant in sump | |
| First zone (° F.) | 91.8 |
| Second zone (° F.) | 94 |
| Third zone (° F.) | 98 |
| Fourth zone (° F.) | 105 |
| Average temperature of spent coolant | |
| First zone (° F.) | 94.4 |
| Second zone (° F.) | 98.7 |
| Third zone (° F.) | 106.3 |
| Fourth zone (° F.) | 119.7 |
| Overall heat transfer coefficient (BTU/hr/ft$^2$/F.) | 46 |

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

We claim:

1. A method for cooling filled food containers having hot contents comprising:
    spraying coolant onto containers having hot contents, the hot contents having an initial average temperature, and the coolant being at least about 40° F. cooler than the initial average temperature; and
    decreasing the flow rate of coolant as the average temperature of the hot contents decreases.

2. The method of claim 1 wherein the coolant temperature does not vary more than 9° F. during the spraying of coolant onto a container.

3. The method of claim 2 wherein the hot contents are cooled from an average temperature of approximately 185° F. to below about 100° F.

4. The method of claim 2 wherein the coolant flow rate is decreased at least three times.

5. The method of claim 2 wherein the coolant flow rate decreases approximately exponentially.

6. The method of claim 1 wherein the container is made of plastic, wherein each container contains approximately 20 oz, wherein the hot contents are cooled from an average temperature of approximately 185° F. within about 8.5 to 13 minutes.

7. The method of claim 1 further comprising conveying the containers, wherein the coolant is sprayed onto the containers while the containers are conveyed.

8. The method of claim 7 wherein the coolant spray density initially exceeds at least about 9 gal/min/ft$^2$.

9. The method of claim 7 wherein the temperature of the coolant after it has completed its contact with the containers does not vary more than about 6° F.

10. An apparatus for cooling containers having hot contents comprising:
    a conveyor for conveying containers having hot contents; and
    spray nozzles placed and directed for spraying coolant onto the containers on the conveyor, the spray nozzles being spaced apart, the spray nozzles having a size corresponding to a flow rate capacity, the spacing and sizing of the spray nozzles selected so that the flow rate of coolant decreases in the direction of movement of the conveyor.

11. The apparatus of claim 10 wherein the spray nozzles are connected to a single source of coolant.

12. The apparatus of claim 10 wherein the flow rate of coolant decreases at least three times in the direction of movement of the conveyor.

13. The apparatus of claim 11 wherein the spray nozzles have substantially the same size and the spacing of the nozzles increases exponentially in the direction of movement of the conveyor.

14. The apparatus of claim 11 further comprising:
    a sump sized and positioned for capturing coolant sprayed onto the containers;
    means for cooling the captured coolant, the means having an inlet, the inlet connected to the sump, the means functioning as the source of coolant for the spray nozzles.

15. The apparatus of claim 14 wherein the spray nozzles are fan nozzles.

16. The apparatus of claim 10 wherein the spacing and sizing of the spray nozzles is selected to achieve a coolant flow rate near the start of the conveyor in excess of about 9 gal/min/ft$^2$.

17. The apparatus of claim 10 wherein the spacing and sizing of the spray nozzles is selected to cool a plastic container containing approximately 20 oz of hot contents from an average temperature of approximately 185° F. to below 100° F. within about 8.5 to 13 minutes.

18. The apparatus of claim 10 wherein the spacing and sizing of the spray nozzles is selected so that the temperature of the coolant after it has completed its contact with the containers does not vary more than about 6° F. in an area where the average temperature of the hot contents decreases by about 60° F.

19. A method for cooling filled food containers having hot contents comprising:
    spraying coolant having a temperature onto containers having hot contents, the hot contents having an initial average temperature, and
    decreasing the flow rate of coolant as the average temperature of the hot contents decreases wherein the temperature of the coolant does not vary more than about 6° F. during the time it takes to cool the average temperature of the hot contents by about 45° F.

20. The method of claim 19 wherein the temperature of the coolant after it has been sprayed onto the containers does not vary more than about 6° F. during the time it takes to cool the average temperature of the hot contents by about 45° F.

* * * * *